US011502859B2

(12) United States Patent
Ji et al.

(10) Patent No.: US 11,502,859 B2
(45) Date of Patent: Nov. 15, 2022

(54) METHOD AND APPARATUS FOR WAKING UP VIA SPEECH

(71) Applicant: BAIDU ONLINE NETWORK TECHNOLOGY (BEIJING) CO., LTD., Beijing (CN)

(72) Inventors: Sheng Ji, Beijing (CN); Weiwei Fang, Beijing (CN); Ning Dai, Beijing (CN); Dan Wang, Beijing (CN); Saisai Zou, Beijing (CN); Mushui Xu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 316 days.

(21) Appl. No.: 16/834,593

(22) Filed: Mar. 30, 2020

(65) Prior Publication Data

US 2020/0328903 A1 Oct. 15, 2020

(30) Foreign Application Priority Data

Apr. 15, 2019 (CN) .......................... 201910297806.4

(51) Int. Cl.
*H04L 12/12* (2006.01)
*G10L 15/08* (2006.01)
(Continued)

(52) U.S. Cl.
CPC .............. *H04L 12/12* (2013.01); *G10L 15/08* (2013.01); *G10L 15/22* (2013.01); *G10L 21/0208* (2013.01); *G10L 2015/088* (2013.01)

(58) Field of Classification Search
CPC ....... G10L 15/28; G10L 15/285; G10L 15/34; G10L 2015/088
See application file for complete search history.

(56) References Cited

U.S. PATENT DOCUMENTS 9,478,231 B1 * 10/2016 Soman ..................... G10L 25/48
2017/0256254 A1 9/2017 Huang et al.
(Continued)

FOREIGN PATENT DOCUMENTS

CN 106157970 A 11/2016
CN 106653027 A 5/2017
(Continued)

OTHER PUBLICATIONS

Gokul, Girish, et al. "Real time sound processing on android." Proceedings of the 14th International Workshop on Java Technologies for Real-Time and Embedded Systems. 2016. (Year: 2016).*
(Continued)

*Primary Examiner* — Brian L Albertalli
(74) *Attorney, Agent, or Firm* — Fay Sharpe LLP

(57) ABSTRACT

The present disclosure provides a method and an apparatus for waking up via a speech. The method includes: obtaining audio data currently collected by an electronic device through an audio-video interface on a hardware abstraction layer of the electronic device; performing noise reduction processing on the collected audio data to generate audio data to be detected; performing wake-up phrase detection on the audio data to be detected to determine whether the audio data to be detected includes a wake-up phrase; and performing wake-up processing on the electronic device in response to determining that the audio data to be detected comprises the wake-up phrase.

18 Claims, 8 Drawing Sheets

(51) Int. Cl.
    *G10L 15/22*     (2006.01)
    *G10L 21/0208*     (2013.01)

(56) References Cited

U.S. PATENT DOCUMENTS

| | | | | |
|---|---|---|---|---|
| 2019/0207777 | A1* | 7/2019 | Patel | G10L 15/08 |
| 2019/0227620 | A1* | 7/2019 | Kim | G06F 3/0673 |
| 2019/0325874 | A1* | 10/2019 | Carreras | G10L 21/0216 |
| 2020/0242198 | A1* | 7/2020 | Ji | G10L 15/16 |

FOREIGN PATENT DOCUMENTS

| | | | | |
|---|---|---|---|---|
| CN | 108133701 A | 6/2018 | | |
| CN | 109545211 A | 3/2019 | | |
| WO | WO-2015067160 A1 * | 5/2015 | | G10H 1/366 |

OTHER PUBLICATIONS

Google, "Sound Trigger; Android Open Source Project." Android Open Source Project, https://source.android.com/devices/audio/sound-trigger. Retrieved Apr. 7, 2022. (Year: 2022).*
Office Action for Chinese Application No. 201910297806.4, dated Aug. 18, 2020, 14 pages.

* cited by examiner

METHOD AND APPARATUS FOR WAKING UP VIA SPEECH

CROSS-REFERENCE TO RELATED APPLICATION

This application claims priority to and benefits of Chinese Patent Application Serial No. 201910297806.4, filed the State Intellectual Property Office of P. R. China on Apr. 15, 2019, the entire content of which is incorporated herein by reference.

FIELD

The present disclosure relates to a field of speech recognition technology, and more particularly to a method and an apparatus for waking up via a speech.

BACKGROUND

At present, in the speech wake-up technology (or technology for waking up via a speech), after signal processing is performed on collected audio data, the audio data subjected to the signal processing is usually sent to an application (APP) through an audio data transmission link, then, the APP performs wake-up detection on the audio data subjected to the signal processing by calling a wake-up algorithm, and wake-up control is performed on the APP based on a detection result.

SUMMARY

An embodiment of the present disclosure provides a method for waking up via a speech. The method includes: obtaining audio data currently collected by an electronic device through an audio-video interface on a hardware abstraction layer of the electronic device; performing noise reduction processing on the collected audio data to generate audio data to be detected; performing wake-up phrase detection on the audio data to be detected to determine whether the audio data to be detected includes a wake-up phrase; and performing wake-up processing on the electronic device in response to determining that the audio data to be detected includes the wake-up phrase.

An embodiment of the present disclosure provides an apparatus for waking up via a speech. The apparatus includes: a data obtaining module, a noise reduction processing module, a wake-up phrase detection module, and a wake-up module. The data obtaining module is configured to obtain audio data currently collected by an electronic device through an audio-video interface on a hardware abstraction layer of the electronic device. The noise reduction processing module is configured to perform noise reduction processing on the collected audio data to generate audio data to be detected. The wake-up phrase detection module is configured to perform wake-up phrase detection on the audio data to be detected to determine whether the audio data to be detected includes a wake-up phrase. The wake-up module is configured to perform wake-up processing on the electronic device in response to determining that the audio data to be detected includes the wake-up phrase.

An embodiment of the present disclosure provides a computing device. The computing includes: a memory, a processor and a computer program stored in the memory and executable by the processor. When the computer program is executed by the processor, the method for waking up via a speech according to the first aspect of embodiments of the present disclosure is implemented.

An embodiment of the present disclosure provides a computer readable storage medium having a computer program stored thereon. When the computer program is executed by a processor, the method for waking up via a speech according to the first aspect of embodiments of the present disclosure is implemented.

BRIEF DESCRIPTION OF THE DRAWINGS

The above and/or other aspects and advantages of the present disclosure will become apparent and more readily appreciated from the following descriptions made for embodiments with reference to the accompanying drawings, in which.

DETAILED DESCRIPTION

Description will be made in detail below to embodiments of the present disclosure. Examples of the embodiments are illustrated in the accompanying drawings, in which, the same or similar numbers represent the same or similar elements or elements with the same or similar functions throughout. Embodiments described below with reference to the accompanying drawings are exemplary, which are intended to explain the present disclosure and may not be understood as a limitation of the present disclosure.

At present, for the android system, an APP or a software development kit (SDK) obtains, through a recorder module, audio data being performed on signal processing, transmits the processed audio data to a wake-up algorithm for wake-up detection, and performs subsequent wake-up control based on a detection result. For the Linux system, the APP or the SDK obtains audio data generated by a task where a signal algorithm is located through an independent process task, transmits the audio data to a wake-up algorithm for wake-up detection, and performs subsequent wake-up control based on a detection result.

However, in the above wake-up ways, a transmission link of the audio data is long and a wake-up delay is long. For example, when performing a test based on different system versions and hardware devices, a delay of an audio link may be about 18 ms-300 ms. Therefore, it may be caused that there is a long delay for a user to obtain data, a wake-up time is late, and a decision speed for a wake-up orientation is further affected.

Therefore, the present disclosure provides a method for waking up via a speech to solve the technical problem of long delay during waking up in the related art.

With a method for waking up via a speech of embodiments of the present disclosure, audio data currently collected by an electronic device is obtained through an audio-video interface on a hardware abstraction layer of the electronic device, noise reduction processing is performed on the collected audio data to generate audio data to be detected, wake-up phrase detection is performed on the audio data to be detected to determine whether the audio data to be detected includes a wake-up phrase, and wake-up processing is performed on the electronic device in response to determining that the audio data to be detected includes the wake-up phrase. In the present disclosure, instead of transmitting the audio data subjected to the noise reduction processing to the application layer through an audio transmission link of a system and performing wake-up detection by the application layer, the noise reduction processing and the function of the wake-up phrase detection for the audio data are performed in the same software layer, which may greatly improve the speech wake-up efficiency and reduce the wake-up delay.

A method and an apparatus for waking up via a speech according to embodiments of the present disclosure will be described below with reference to the accompanying drawings.

Figure 1:
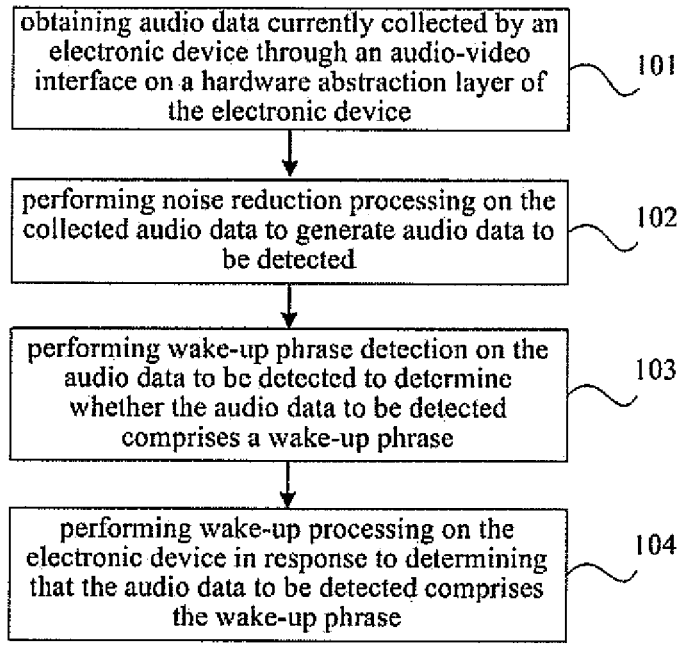
FIG. 1 is a flow chart illustrating a method for waking up via a speech according to embodiments of the present disclosure.

FIG. 1 is a flow chart illustrating a method for waking up via a speech according to embodiments of the present disclosure.

Embodiments of the present disclosure take that the method for waking up via a speech is configured in the apparatus for waking up via a speech as an example. The apparatus for waking up via a speech may be applied to an electronic device, to enable the electronic device to execute a speech wake-up function.

The electronic device may be a hardware device having an operating system, a touch screen and/or a display screen, such as, a mobile phone, a tablet, a personal digital assistant, a wearable device, an on-vehicle device, a smart speaker, and a smart home appliance, etc.

As illustrated in FIG. 1, the method for waking up via a speech includes the following.

At block 101, audio data currently collected by an electronic device is obtained through an audio-video interface on a hardware abstraction layer of the electronic device.

In an embodiment of the present disclosure, when a user wants to perform wake-up, speech control and the like on the electronic device, the user may input audio data by inputting a speech. Correspondingly, when the electronic device monitors the audio data inputted via the speech of the user in a listening mode, the audio data may be collected by a microphone array, and the audio data collected by the microphone array may be obtained through the audio-video interface on the hardware abstraction layer of the electronic device At block 102, noise reduction processing is performed on the collected audio data to generate audio data to be detected.

It should be understood that, when the user inputs the audio data, some noise data may be carried in the audio data due to the influence of external interference noise. For example, when a user is located indoors and a television indoors is playing a television program, a sound played by the television is the external interference noise. For another example, when the user is outdoors, such as in a park, a shopping mall or a road, the external interference noise may be a bird call, a human conversation sound, a car honking sound, etc.

Therefore, with the present disclosure, in order to improve the accuracy and the success rate of subsequent speech wake-up, noise reduction processing may be performed on the collected audio data to generate the audio data to be detected. For example, noise reduction processing may be performed on the collected audio data based on an audio noise reduction algorithm in the related art to generate the audio data to be detected. Alternatively, in order to improve noise reduction effect, noise reduction processing may be performed on the collected audio data based on an audio noise reduction algorithm based on deep learning to generate the audio data to be detected. For example, the audio noise reduction algorithm may include an audio noise reduction algorithm based on a recurrent neural network (RNN). The present disclosure is not limited thereto.

At block 103, wake-up phrase detection is performed on the audio data to be detected to determine whether the audio data to be detected includes a wake-up phrase.

In embodiments of the present disclosure, the wake-up phrase may be predefined by a manufacturer of the electronic device, or may also be set by the user, which is not limited. For example, the user may control the electronic device to enter a custom wake-up phrase mode. A way of entering the custom wake-up phrase mode may be triggering an entity key, issuing a speech instruction or the like. The user may be prompted to set a wake-up phrase wanted after the electronic device enters the custom wake-up phrase mode. At this time, the user may set the wake-up phrase based on his/her needs. For example, the electronic device is a speaker called Xiaodu, the wake-up phrase may be "Xiaodu, Xiaodu".

In an embodiment of the present disclosure, after the audio data to be detected is generated, wake-up phrase detection may be performed on the audio data to be detected to determine whether the audio data to be detected includes the wake-up phrase. Alternatively, wake-up phrase detection may be performed on the audio data to be detected according to a wake-up algorithm in the related art, thereby determining whether the audio data to be detected includes the wake-up phrase.

As an example, each data frame in the audio data to be detected may be respectively compared with each data frame in the wake-up phrase. When the audio data to be detected includes all the data frames in the wake-up phrase, and an arrangement sequence and position relationships among the data frames included in the audio data to be detected are the same as an arrangement sequence and position relationships among the data frames in the wake-up phrase, it is determined that the audio data to be detected includes the wake-up phrase.

It should be noted that, in the above example, it is determined whether the audio data to be detected includes the wake-up phrase only by comparing each data frame in the audio data to be detected with each data frame in the wake-up phrase respectively. In an actual application, other wake-up algorithms may also be used to determine whether the audio data to be detected includes the wake-up phrase, and embodiments of the present application are not limited thereto.

For example, same as above, the wake-up phrase is "Xiaodu, Xiaodu". It is assumed that the audio data to be detected is "Xiaodu, do you know how naughty I was when I was a child". Although the audio data to be detected includes words "Xiaodu", "xiao", and "du", these words included in the audio data to be detected are separate with each other. Therefore, it may be determined that the audio data to be detected does not include the wake-up phrase. For another example, it is assumed that the audio data to be detected is "Xiaodu, is the current temperature less than 26 degrees". Although the audio data to be detected includes the words "Xiaodu", "xiao", and "du", the order and positions of these words in the audio data to be detected are not identical with that in the wake-up phrase. Therefore, it may be determined that the audio data to be detected does not include the wake-up phrase.

At block 104, wake-up processing is performed on the electronic device in response to determining that the audio data to be detected includes the wake-up phrase.

In an embodiment of the present disclosure, when the audio data to be detected includes the wake-up phrase, wake-up processing may be performed on the electronic device. In the present disclosure, the noise reduction processing and the function of the wake-up phrase detection for the audio data are performed in the same software layer, i.e., the hardware abstraction layer, instead of transmitting the audio data subjected to the noise reduction processing to the application layer through an audio transmission link of a system and then performing wake-up detection by the application layer, thus greatly improving the speech wake-up efficiency and reducing the wake-up delay.

It should be noted that, in an actual application, the electronic device is controlled by the application layer. Therefore, when the audio data to be detected includes the wake-up phrase, a wake-up triggering message may be sent to the application layer. For example, the wake-up triggering message may be sent to the application layer through a RPC protocol, a socket protocol or the like, such that wake-up control may be performed on the electronic device after the application layer receives the wake-up triggering message.

With the method for waking up via a speech according to embodiments of the present disclosure, the audio data currently collected by the electronic device is obtained through the audio-video interface on the hardware abstraction layer of the electronic device, the noise reduction processing is performed on the collected audio data to generate the audio data to be detected, the wake-up phrase detection is performed on the audio data to be detected to determine whether the audio data to be detected includes the wake-up phrase, and the wake-up processing is performed on the electronic device in response to determining that the audio data to be detected includes the wake-up phrase. With the present disclosure, the noise reduction processing and the function of the wake-up phrase detection for the audio data are performed in the same software layer, instead of transmitting the audio data subjected to the noise reduction processing to the application layer through the audio transmission link of the system, and then performing wake-up detection through the application layer, thus greatly improving the speech wake-up efficiency and reducing the wake-up delay.

It should be noted that, in an actual application, there may be interference audio data in multiple orientations due to the influence of external interference noise. Therefore, in an embodiment of the present disclosure, in order to improve the accuracy of speech recognition, a wake-up orientation may also be detected to determine audio data of a current wake-up orientation after it is determined that the audio data to be detected includes the wake-up phrase. Thereby, by performing processing and recognition on the audio data of the wake-up orientation, the accuracy of a recognized result may be improved. The above procedure will be described in detail below with reference to FIG. 2.

Figure 2:
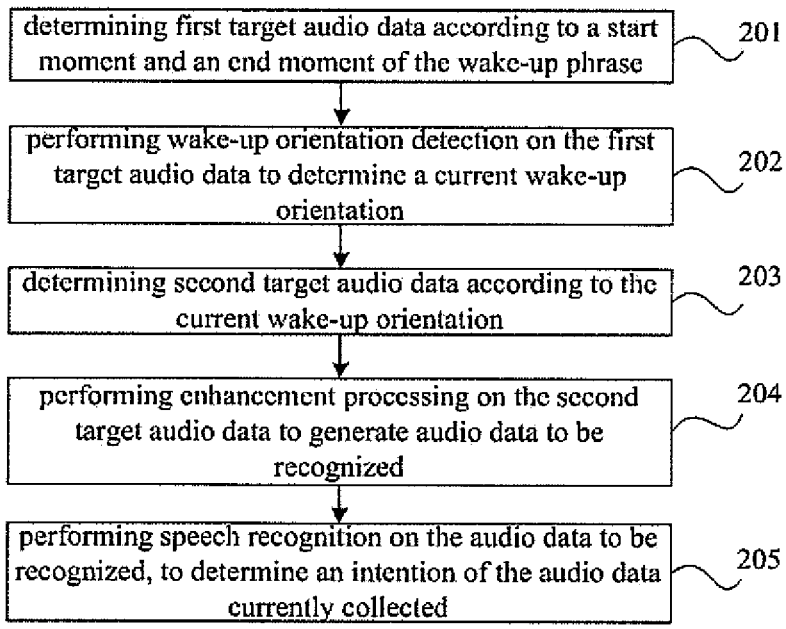
FIG. 2 is a flow chart illustrating a method for waking up via a speech according to embodiments of the present disclosure.

FIG. 2 is a flow chart illustrating a method for waking up via a speech according to embodiments of the present disclosure As illustrated in FIG. 2, on the basis of the embodiment illustrated in FIG. 1, the method for waking up via a speech may include the following.

At block 201, first target audio data is determined according to a start moment and an end moment of the wake-up phrase.

In an actual application, the user may input some invalid audio data before inputting the wake-up phrase. For example, the audio data to be detected is "Hnimm, Xiaodu, Xiaodu, help me play song A". At this time, actual valid audio data is the audio data after a start moment of the wake-up phrase. Therefore, in the present disclosure, in order to improve the efficiency of speech recognition and the accuracy of a recognition result, the first target audio data may be determined according to the start moment and an end moment of the wake-up phrase. The start moment and an end moment of the wake-up phrase are recorded as the start-end moments in the present disclosure. The first target audio data at least includes audio data within a period from the start moment to the end moment of the wake-up phrase.

For example, the first audio data may be all audio data after the start moment of the wake-up phrase, or all audio data within a preset period after the start moment of the wake-up phrase, and so on, which is not limited thereto. For example, it is assumed that a duration of the audio data to be detected is 60 seconds and the wake-up phrase appears at the 20th second, audio data between the 20th second and the 40th second may be used as the first target audio data.

At block 202, wake-up orientation detection is performed on the first target audio data to determine a current wake-up orientation.

In an embodiment of the present disclosure, the current wake-up orientation is an orientation of an awakener or the user. For example, the wake-up orientation may be 30 degrees south-east of the electronic device.

In an embodiment of the present disclosure, there may be interference audio data in a plurality of orientations in the environment where the electronic device is located. Therefore, in order to improve the accuracy of speech recognition, the wake-up orientation detection may be performed on the first target audio data to determine the current wake-up orientation.

For example, when a wake-up phrase such as "Xiaodu, Xiaodu" appears at 30 degrees south-east, the orientation at the 30 degrees south-east of the electronic device may be determined as the current wake-up orientation.

At block 203, second target audio data is determined according to the current wake-up orientation.

In an embodiment of the present disclosure, the second target audio data may be determined from the first target audio data according to the current wake-up orientation after the current wake-up orientation is determined.

For example, it is assumed that the awakener is located indoors and the electronic device is a smart speaker. When the mobile phone of the awakener plays music or video, and/or when a television or a computer plays music or video, the smart speaker collects audio data from a plurality of orientations. Therefore, in order to improve the accuracy of speech recognition, the wake-up orientation of the awakener, i.e., the current wake-up orientation, may be determined, and the second target audio data from the current wake-up orientation may be determined from the first target audio data according to the current wake-up orientation.

At block 204, enhancement processing is performed on the second target audio data to generate audio data to be recognized.

In an embodiment of the present disclosure, in order to improve the accuracy of the speech recognition, valid or useful audio data may be extracted from the first target audio data, which is recorded as the audio data to be recognized in the present disclosure. In detail, enhancement processing may be performed on the second target audio data to generate the audio data to be recognized.

Alternatively, enhancement processing may be performed on the second target audio data according to a speech enhancement algorithm in the related art to generate the audio data to be recognized. For example, enhancement processing may be performed on the second target to generate the audio data to be recognized according to a speech enhancement algorithm based on spectral subtraction, a speech enhancement algorithm based on wavelet analysis, a speech enhancement algorithm based on Kalman filter, an enhancement method based on signal subspace, a speech enhancement method based on auditory masking effect, a speech enhancement method based on independent component analysis, a speech enhancement method based on neural network, etc., which is not limited in the present disclosure.

At block 205, speech recognition is performed on the audio data to recognized to determine an intention of the audio data currently collected.

In an embodiment of the present disclosure, after the audio data to be recognized is generated, speech recognition may be performed on the audio data to be recognized to determine the intention of the audio data currently collected. For example, speech recognition may be performed on the audio data to be recognized to determine text information corresponding to the audio data to be recognized, and then semantic recognition is performed on the text information to determine the intention of the audio data currently collected. Thereby, the electronic device may be controlled according to the intention of the audio data currently collected.

For example, when the electronic device is the speaker called Xiaodu, and it is assumed that the audio data to be recognized is "Xiaodu, Xiaodu, please help me play song A", the intention of the audio data currently collected is to play song A. Thus the speaker may be controlled to play song A subsequently.

Compared with the previous embodiment, the technical solution in this embodiment of the present disclosure further has at least the following technical effects or advantages.

In embodiments of the present disclosure, by determining the first target audio data according to the start moment and the end moment of the wake-up phrase, the efficiency and the success rate of subsequent speech processing and recognition may be improved. By performing wake-up orientation detection on the first target audio data to determine the current wake-up orientation, and determining the second target audio data according to the current wake-up orientation, the accuracy of the speech recognition may be improved. By performing enhancement processing on the second target audio data to generate the audio data to be recognized, and performing speech recognition on the audio data to be recognized to determine the intention of the audio data currently collected, the accuracy of the speech recognition may be further improved.

In an actual application, some invalid audio data may exist in the audio data to be recognized obtained by performing the enhancement processing. For example, duration of the audio data to be recognized is 10 seconds, while there is no valid audio data for the first second and the last second. For example, the first second and the last second of the audio data are mute. Therefore, as a possible implementation of embodiments of the present disclosure, on the basis of embodiments illustrated in FIG. 2, before the actions at block 205, the method for waking up via a speech may further include: filtering the audio data to be recognized through voice activity detection (VAD) processing. In detail, speech endpoints of the audio data to be recognized, such as a start point and an end point, may be recognized through VAD processing, and then audio data before the start point and audio data after the end point may be filtered away to reserve valid audio data.

For example, it is assumed that the duration of the audio data to be recognized is 10 seconds and the speech endpoints are determined to be located at the first second and the ninth second through the VAD processing, thus audio data before the first second and audio data between the ninth second and the tenth second may be filtered out, reserving audio data between the first and the ninth second.

Actions at block 205 may include: performing speech recognition on the filtered audio data to recognized to determine the intention of the audio data currently collected. Thereby, the efficiency of speech recognition may be improved.

Figure 3:
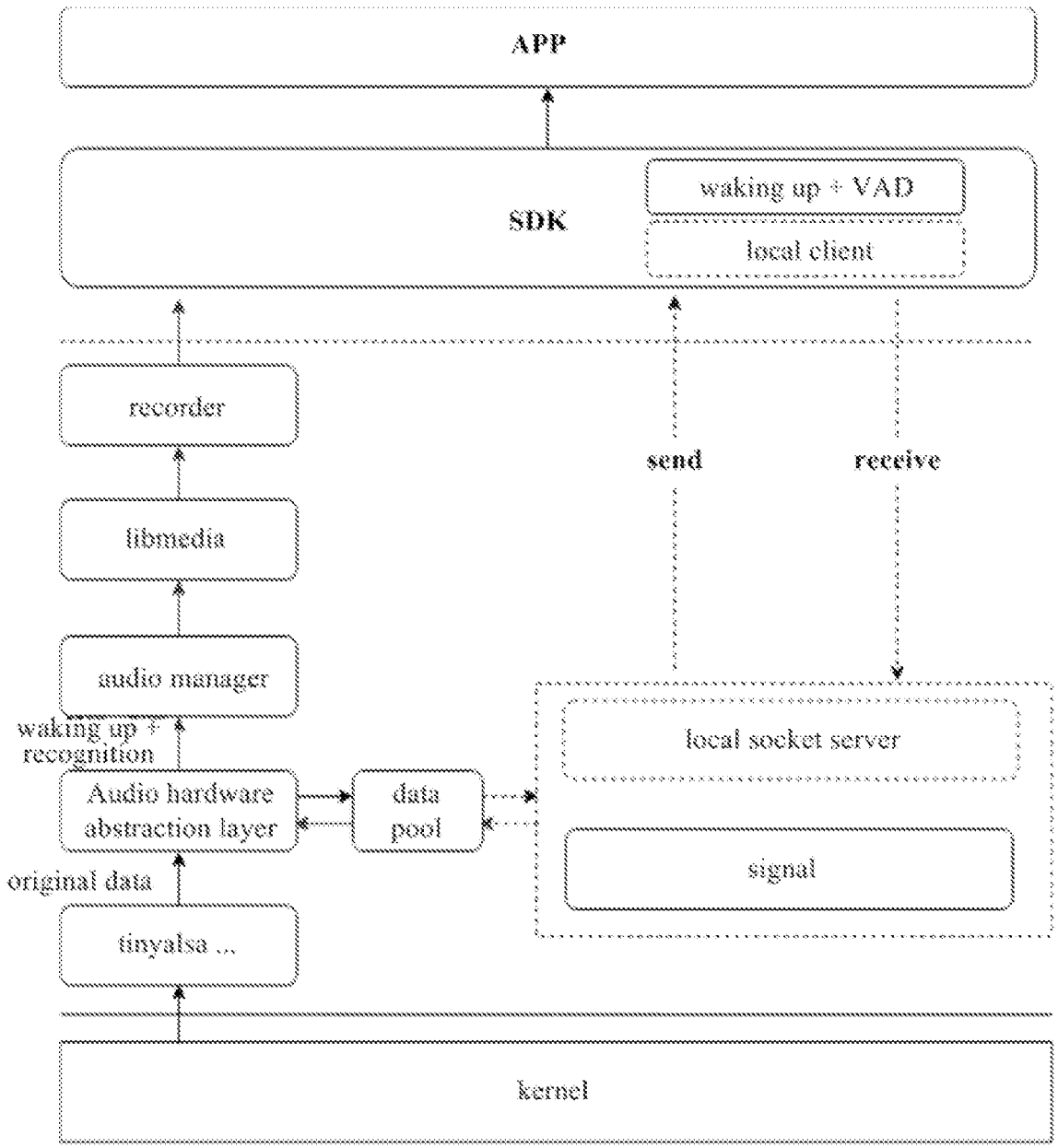
FIG. 3 is a schematic diagram illustrating a wake-up method in the related art.

For example, referring to FIG. 3, FIG. 3 is a schematic diagram illustrating a wake-up method in the related art. In the related art, after audio data is collected, the collected audio data passes through a hardware abstraction layer to a data pool and then to a signal processing algorithm. The signal processing algorithm module processes the collected audio data and then returns the processed audio data to the hardware abstraction layer by the same route. The hardware abstraction layer transmits the processed audio data to an application layer (SDK) through an audio data transmission link. The application layer calls a wake-up detection algorithm to perform wake-up detection on the processed audio data. After the wake-up phase detection is completed, the application layer transmits the audio data subjected to the wake-up phase detection to a signal processing algorithm to inform the signal processing algorithm about a start moment and a stop moment of the wake-up phrase. Then the signal processing algorithm detects wake-up orientation according to the start moment and the stop moment, and the wake-up orientation is notified to the application layer. The application layer may perform intention recognition according to the wake-up orientation.

However, with the above wake-up method in the related art, there is a long transmission link and a long wake-up delay for the audio data, thereby causing large hysteresis in wake-up orientation recognition and intention recognition.

However, in embodiments of the present disclosure, when the method for waking up via a speech is applied to a speech recognition system, by sinking the wake-up detection algorithm to the software layer where the signal processing algorithm locates, after signal processing is performed on the audio data, the processed audio data may be immediately sent to the wake-up detection algorithm, and the wake-up detection algorithm notifies the start moment and the stop moment of the wake-up phrase to the signal processing algorithm, then the signal processing algorithm executes the judgment for the wake-up orientation.

The speech recognition system includes links such as signal processing, speech wake-up, speech recognition, natural language processing, and the like. The sinking of wake-up detection algorithm is mainly optimized for the link of the speech wake-up, so as to improve the wake-up efficiency, thereby improving the efficiency of wake-up orientation and intention recognition.

Figure 4:
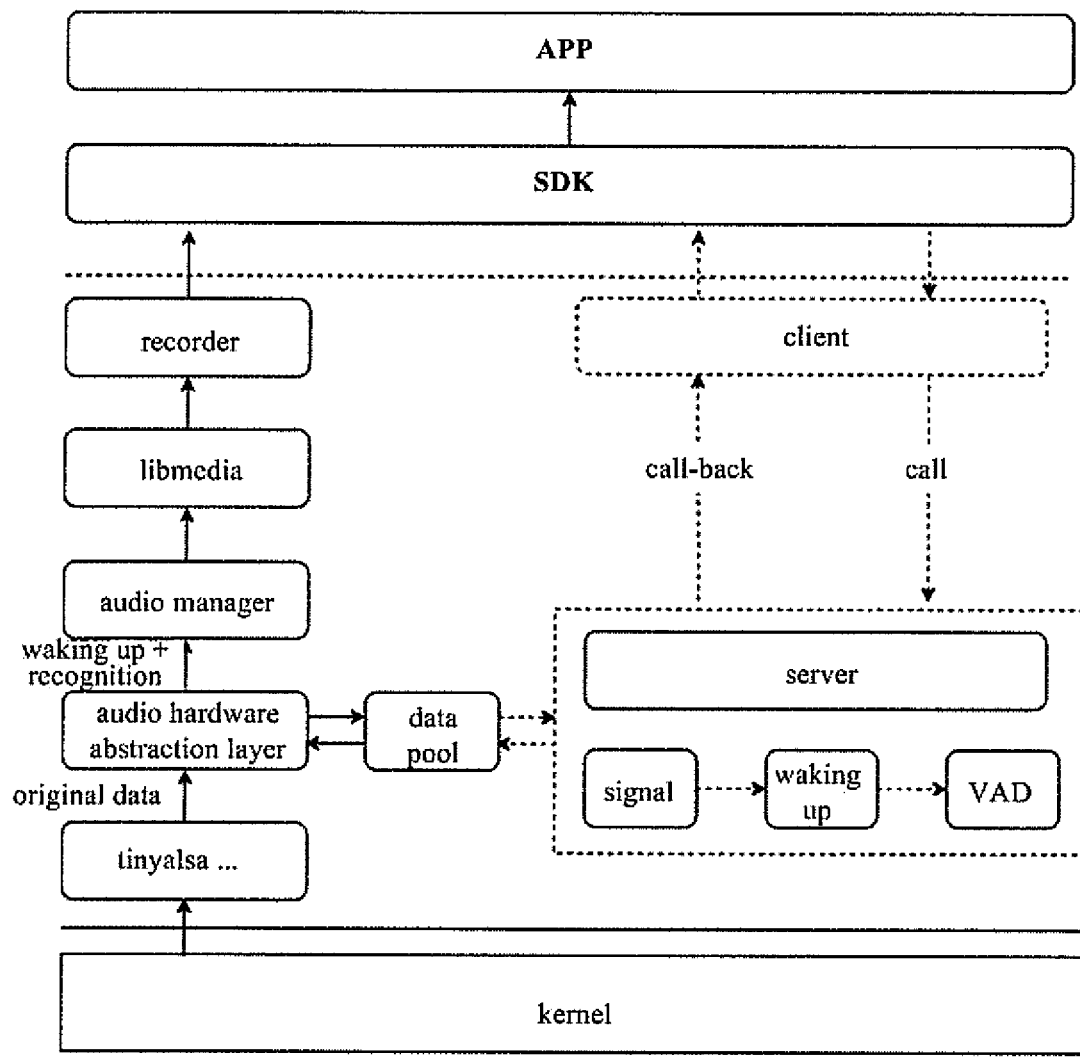
FIG. 4 is a schematic diagram illustrating a wake-up method according to embodiments of the present disclosure.

For example, referring to FIG. 4, FIG. 4 is a schematic diagram illustrating a wake-up method in embodiments of the present disclosure. FIG. 4 illustrates an example in which the speech wake-up algorithm is applied to an electronic device of an android system. When a recorder is turned on, collected audio data may be obtained by utilizing an alsa/tinyalsa library, and noise reduction processing is performed on the collected audio data through a signal processing algorithm. In the related art, the denoised audio dat is uploaded to the application layer (SDK) step by step through a recording channel, and then wake-up detection is performed on the uploaded audio data. In the present disclosure, different from that in the related art, the wake-up detection algorithm is sunk, and the audio data subjected to the noise reduction processing may be immediately sent to the wake-up detection algorithm, thus shortening the transmission link of the audio data and reducing the wake-up delay.

In other words, the application layer and the hardware abstraction layer are different process spaces. In the related art, data transmission needs to be performed across processes when the wake-up processing is performed. However, in the present disclosure, by sinking the wake-up detection algorithm, data transmission across the processes is not necessary, data transmission may be implemented in one process, and wake-up efficiency may be improved.

Further, in the related art, the signal processing algorithm is performed on the entire audio data. After the application layer is waken up successfully, or the start moment and the end moment of the wake-up phrase is recognized, for example, after the start moment of the audio data recognized by the application layer is the thirtieth second, the signal processing algorithm may perform wake-up orientation detection and intention recognition on the audio data after the thirtieth second. That is, the conversion for a processing logic of the signal processing algorithm takes 30 seconds, which is a long time.

However, in the present disclosure, since the transmission link of audio data is shortened, the conversion of the processing logic of the signal processing algorithm may be reduced, and the real-time of wake-up orientation detection and intention recognition may be improved.

It should be noted that, FIG. 3 and FIG. 4 are only examples applied to the android system. In an actual application, the present disclosure may also be applied to other systems, such as the Linux system, which is not limited.

In embodiments of the present disclosure, after the noise reduction processing is performed on the collected audio data to generate the audio data to be detected, the audio data to be detected is processed in two paths. In one path, the wake-up recognition is performed on the audio data to be detected directly to recognize whether there is a wake-up phrase in the audio data to be detected, the start moment and the end moment at which the wake-up phrase appears, and the wake-up orientation. In the other path, the audio data to be detected is transmitted to an application in the electronic device through the audio data transmission link in the electronic device, such that the application may recognize the intention of the audio data currently collected. In other words, in an actual application, intention recognition, generation of a control instruction and the like may be implemented by the application layer.

The audio data transmitted by the audio data transmission link may also be stored in a special buffer. The audio data subjected to the signal processing is divided into data for wake-up recognition and data for intention recognition, and data uploaded to the application layer is a mixture of the data for wake-up recognition and the data for intention recognition, i.e. mixed data. Therefore, there is a need to mix the data for wake-up recognition and the data for intention recognition in the buffer and then to return the mixed data to the hardware abstraction layer for uploading.

As a possible implementation, the intention of the audio data currently collected may be directly recognized by the application. In detail, the application may determine the second target audio data according to the current wake-up orientation, performs enhancement processing on the second target audio data to generate the audio data to be recognized, and performs speech recognition on the audio data to be recognized to determine the intention of the audio data currently collected.

As another possible implementation, the intention of the audio data currently collected may be recognized by a server terminal which is recorded as a server in the present disclosure. It should be understood that, different electronic devices have different processing logics and storage spaces. Therefore, in order to reduce the influence of storage space limitation for the electronic device, in the present disclosure, the application may send the audio data to be detected to the server. The server determines the second target audio data according to the current wake-up orientation, performs enhancement processing on the second target audio data to generate the audio data to be recognized, and performs speech recognition on the audio data to be recognized to determine the intention of the audio data currently collected.

As a possible implementation, referring to FIG. 4, both the wake-up algorithm and the VAD processing algorithm are sunk to the same software layer as the signal processing algorithm. When the electronic device is initiated, the user may perform configuration to determine whether to sink the wake-up algorithm and the VAD processing algorithm to the same software layer as the signal processing algorithm. For example, the user may only sink the wake-up detection algorithm to the same software layer as the signal processing algorithm, or the user may only sink the VAD processing algorithm to the same software layer as the signal processing algorithm, or the user may also sink both the wake-up algorithm and the VAD processing algorithm simultaneously to the same software layer as the signal processing algorithm. A default program of the electronic device may also be used to determine whether to sink the wake-up algorithm and the VAD processing algorithm to the same software layer as the signal processing algorithm.

As another possible implementation, the user may also perform configuration to determine whether the wake-up detection and the VAD processing are performed. For example, the user may perform configuration to only perform the wake-up detection, or may perform configuration to only perform the VAD processing, or may perform configuration to perform both the wake-up detection and the VAD processing. A default program of the electronic device may also be used to determine whether to perform the wake-up detection and the VAD processing.

In embodiments of the present disclosure, before actions at block 201, a configuration message for indicating to perform wake-up detection on the audio data to be detected in the hardware abstraction layer may also be obtained from the application layer. That is, only when the configuration message sent by the application layer indicates to perform wake-up detection on the audio data to be detected in the hardware abstraction layer, the wake-up detection may be performed on the audio data to be detected in the hardware abstraction layer. Otherwise, the wake-up detection is not performed on the audio data to be detected in the hardware abstraction layer. In other words, in the present disclosure, when the electronic device starts up, the application layer may control to determine whether to perform the wake-up detection in the hardware abstraction layer.

Similarly, the application layer may also control to determine whether to perform VAD processing in the hardware abstraction layer. That is, the configuration message may also be configured to indicate whether the VAD processing needs to be performed in the hardware abstraction layer.

As a possible implementation, after the audio data to be detected is generated, the audio data to be detected may be stored in the above preset buffer. In response to determining that the audio data to be detected in the preset buffer reaches a threshold, wake-up phrase detection is performed on the audio data to be detected in the preset buffer. The above procedure will be described in detail below with reference to FIG. 5.

Figure 5:
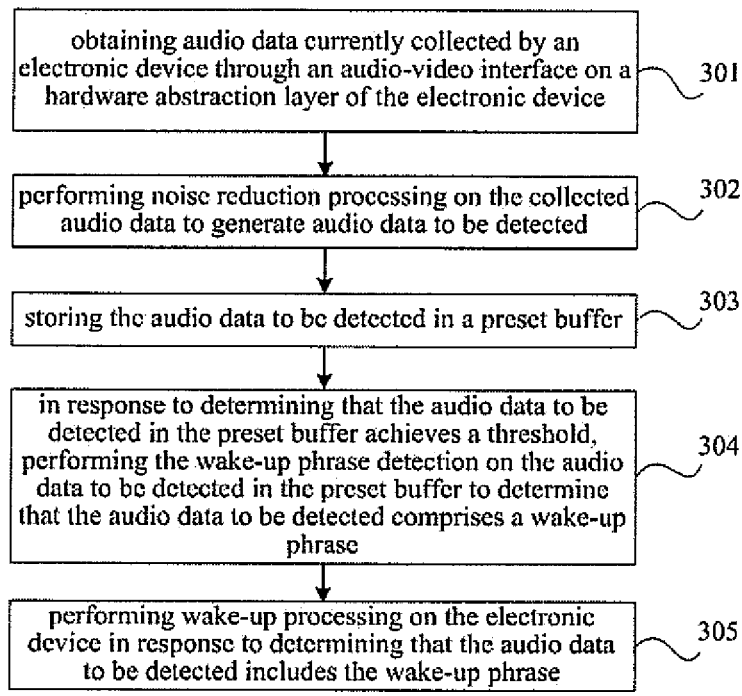
FIG. 5 is a flow chart illustrating a method for waking up via a speech according to embodiments of the present disclosure.

FIG. 5 is a flow chart illustrating a method for waking up via a speech according to an embodiment of the present disclosure.

As illustrated in FIG. 5, the method for waking up via a speech includes following.

At block 301, audio data currently collected by an electronic device is obtained through an audio-video interface on a hardware abstraction layer of the electronic device.

The execution procedure of the actions at block 301 may refer to the execution procedure of the actions at block 101 in the above embodiments, which is not elaborated herein.

At block 302, noise reduction processing is performed on the collected audio data to generate audio data to be detected.

In an embodiment of the present disclosure, the noise reduction algorithm is in one separate task, and the wake-up detection algorithm is another task. The noise reduction processing may be performed on the collected audio data through a first thread to generate the audio data to be detected.

At block 303, the audio data to be detected is stored in a preset buffer.

In an embodiment of the present disclosure, the preset buffer may be set in advance. For example, the preset buffer may be a ring buffer.

At block 304, in response to determining that the audio data to be detected in the preset buffer reaches a threshold, wake-up phrase detection is performed on the audio data to be detected in the preset buffer to determine whether the audio data to be detected includes a wake-up phrase.

In an embodiment of the present disclosure, the threshold may be set in advance. For example, the threshold may be preset by a built-in program of the electronic device, or preset by the user, which is not limited. The threshold may be N data frames.

In an embodiment of the present disclosure, in response to determining that the audio data to be detected in the preset buffer reaches the threshold, wake-up phrase detection may be performed on the audio data to be detected in the preset buffer through a second thread. Therefore, the noise reduction processing and the wake-up detection is driven by data, which can reduce unnecessary CPU competition and improve the efficiency of task processing.

Figure 6:
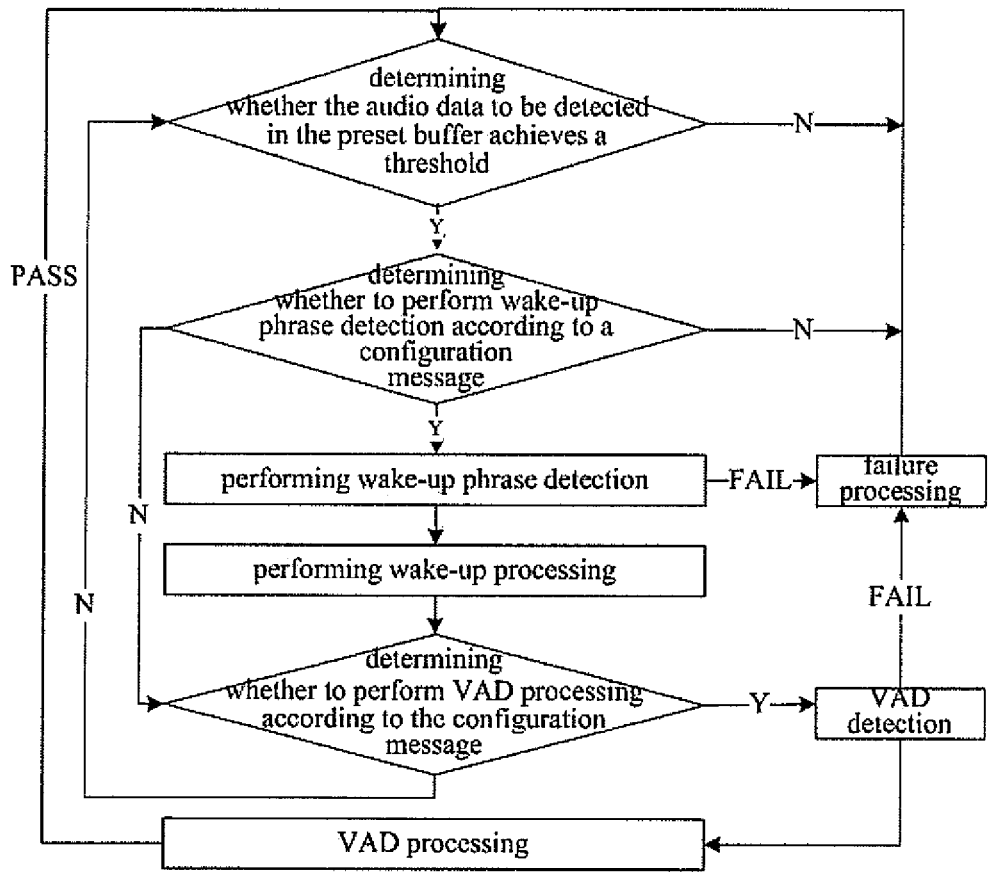
FIG. 6 is a flow chart illustrating a task processing procedure according to embodiments of the present disclosure.

For example, referring to FIG. 6, it may be monitored whether the audio data to be detected in the preset buffer reaches the threshold. If yes, it is determined, according to the configuration message, whether the wake-up detection is performed. If yes, the wake-up detection is performed, and it is determined, according to the configuration message, whether the VAD processing is further to be performed after the wake-up detection is completed. If yes, the VAD processing is performed.

Figure 7:
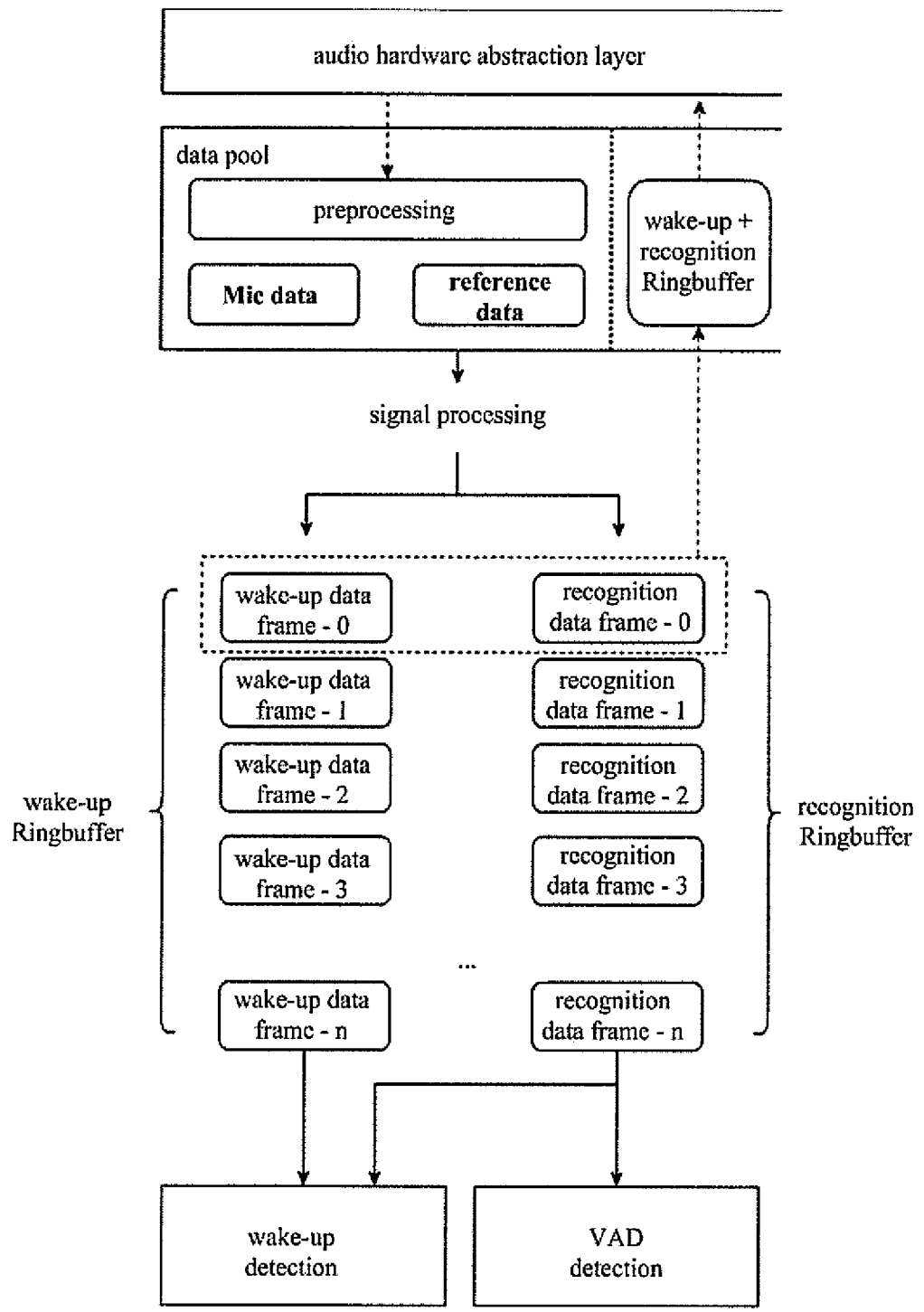
FIG. 7 is a schematic diagram illustrating wake-up detection and a VAD processing procedure according to embodiments of the present disclosure.

The procedure for performing wake-up detection on the audio data to be detected which is stored in the preset buffer may refer to FIG. 7. Each recognition data frame in the audio data to be detected may be respectively compared with each wake-up data frame in the wake-up phrase, to determine whether the audio data to be detected includes the wake-up phrase.

The VAD processing may be performed to determine speech endpoints of the audio data to be detected according to each recognition data frame.

At block 305, wake-up processing is performed on the electronic device in response to determining that the audio data to be detected includes the wake-up phrase.

The execution procedure at block 305 may refer to the execution procedure at block 104 in the above embodiment, which is not elaborated here.

Figure 8:
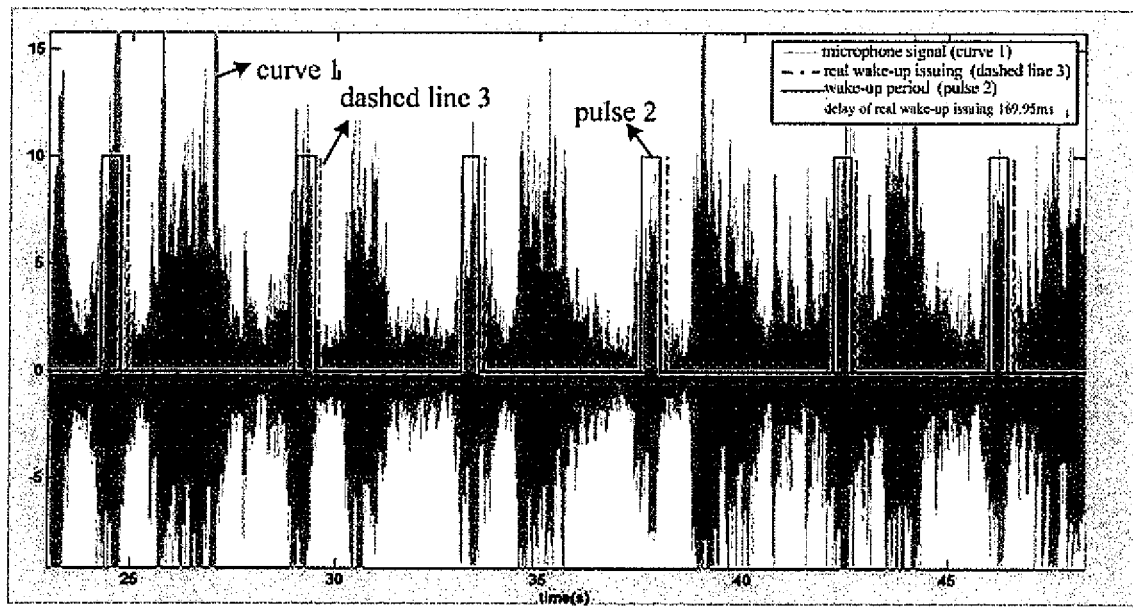
FIG. 8 is a schematic diagram illustrating a test result of waking up via a speech in the related art.
Figure 9:
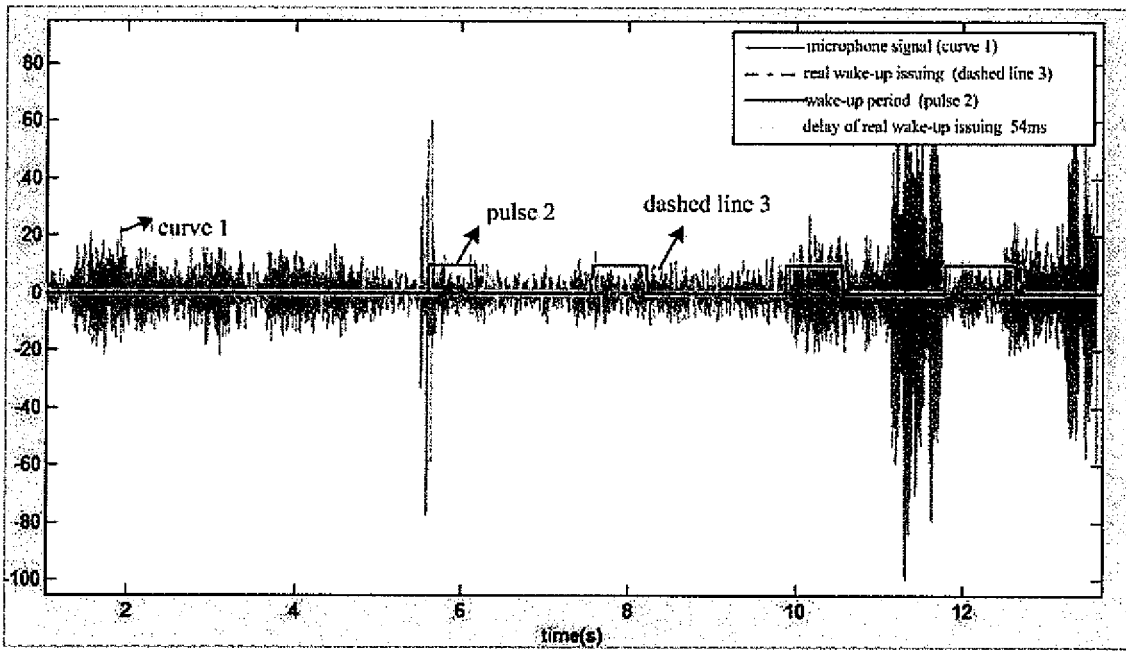
FIG. 9 is a schematic diagram illustrating a test result of waking up via a speech according to embodiments of the present disclosure.

For example, referring to FIG. 8 and FIG. 9, FIG. 8 is a schematic diagram illustrating a test result of waking up via a speech in the related art, and FIG. 9 is a schematic diagram illustrating a test result of waking up via a speech according to an embodiment of the present disclosure. It may be seen from FIG. 8 and FIG. 9 that, under a same source test condition, an issuing timing of a wake-up state in the related art is slower than that in the present disclosure. In terms of average time, in the related art, an average delay of an issuing moment to a real start moment of a wake-up phrase is 169.95 ms, while this value is 54 ms (FIG. 9) in the present disclosure. The value is increased by 115.95 ms on average.

For example, in the same source test condition, speech wake-up rates in the related art and the present disclosure are illustrated in Table 1.

TABLE 1

Comparison for Wake-up Rates under External Noise

| Wake-up test (120 sentences) | | 1 meter | 3 meters | 5 meters | Average |
|---|---|---|---|---|---|
| Silence | The present disclosure | 100% | 100% | 100% | 100% |
| | The related art | 100% | 100% | 100% | 100% |
| | Increasement | 0.00% | 0.00% | 0.00% | 0.00% |
| External noise 65 db | The present disclosure | 100% | 98.33% | 97.50% | 98.61% |
| | The related art | 100% | 98.33% | 96.67% | 98.33% |
| | Increasement | 0.00% | 0.00% | 0.83% | 0.28% |
| External noise 75 db | The present disclosure | 100% | 90.83% | 86.67% | 92.50% |
| | The related art | 95.83% | 87.50% | 80.00% | 87.78% |
| | Increasement | 4.17% | 3.33% | 6.67% | 4.72% |

It may be seen from Table 1 that, under a condition where the external noise is 75 db, the wake-up rate of the present disclosure is increased by more than 4% on average compared with the related art, while the wake-up rate is even for the wake-up rates of the present disclosure and the related art under other conditions.

For example, in environment having external noise, a wake-up test is performed on the electronic device by utilizing 200 sentences. The test results of a word accuracy and a sentence accuracy in the present disclosure and the related art are illustrated in Table 2.

TABLE 2

Comparison for Recognition Rates under External Noise

| Versions | External noise | | | | | | | |
|---|---|---|---|---|---|---|---|---|
| | 1 meter | | 3 meters | | 5 meters | | Average | |
| | Word accuracy | Sentence accuracy | Word accuracy | Sentence accuracy | Word accuracy | Sentence accuracy | Word accuracy | Sentence accuracy |
| The present disclosure | 95.12% | 88% | 90.15% | 84.00% | 85.84% | 75.50% | 90.37% | 82.50% |
| The related art | 94.75% | 87% | 89.99% | 80.50% | 85.68% | 75.00% | 90.14% | 80.83% |
| Increasing | 0.37% | 1% | 0.16% | 3.50% | 0.16% | 0.50% | 0.23% | 1.67% |

The word accuracy represents the accuracy of each word in a sentence. When the word accuracy is 100%, it represents that each word in the sentence is correctly recognized. The sentence accuracy is the accuracy of meaning of each sentence. When the sentence accuracy is 100%, it represents that the meaning of the sentence is correct while the meaning of each word is not necessarily correct.

It may be seen from Table 2 that, under the same source test condition (External noise 65 db), increasement of the average recognition rate of the present disclosure relative to the related art is 1.67%, and the performance on the external noise corresponding to 3 meters is obviously improved to 3.5%.

In order to implement the above embodiments, the present disclosure further provides an apparatus for waking up via a speech.

Figure 10:
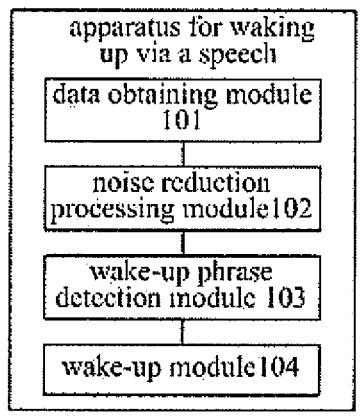
FIG. 10 is a block diagram illustrating an apparatus for waking up via a speech according to embodiments of the present disclosure.

FIG. 10 is a block diagram illustrating an apparatus for waking up via a speech according to an embodiment of the present disclosure.

As illustrated in FIG. 10, the apparatus for waking up via a speech may include: a data obtaining module 101, a noise reduction processing module 102, a wake-up phrase detection module 103, and a wake-up module 104.

The data obtaining module 101 is configured to obtain audio data currently collected by an electronic device through an audio-video interface on a hardware abstraction layer of the electronic device.

The noise reduction processing module 102 is configured to perform noise reduction processing on the collected audio data to generate audio data to be detected.

The wake-up phrase detection module 103 is configured to perform wake-up phrase detection on the audio data to be detected to determine whether the audio data to be detected includes a wake-up phrase.

The wake-up module 104 is configured to perform wake-up processing on the electronic device in response to determining that the audio data to be detected includes the wake-up phrase.

Figure 11:
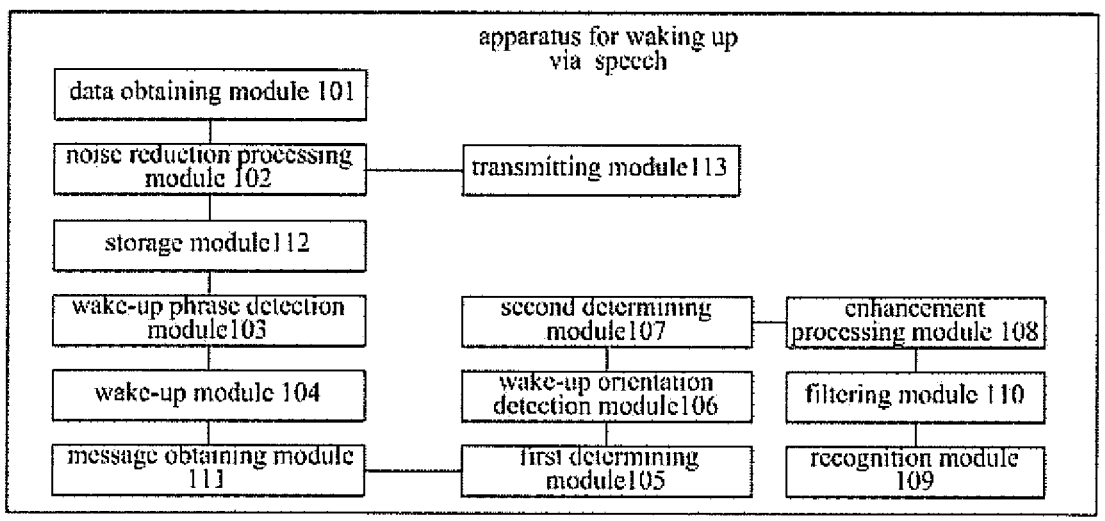
FIG. 11 is a block diagram illustrating an apparatus for waking up via a speech according to embodiments of the present disclosure.

Further, in a possible implementation of embodiments of the present disclosure, referring to FIG. 11, on the basis of the embodiment illustrated in FIG. 10, the apparatus for waking up via a speech may further include: a first determining module 105, a wake-up orientation detection module 106, a second determining module 107, an enhancement processing module 108, a recognition module 109, a filtering module 110, a message obtaining module 111, a storage module 112 and a transmitting module 113.

The first determining module 105 is configured to determine first target audio data according to a start moment and an end moment of the wake-up phrase in response to determining that the audio data to be detected includes the wake-up phrase.

The wake-up orientation detection module 106 is configured to perform wake-up orientation detection on the first target audio data to determine a current wake-up orientation.

The second determining module 107 is configured to determine second target audio data according to the current wake-up orientation.

The enhancement processing module 108 is configured to perform enhancement processing on the second target audio data to generate audio data to be recognized.

The recognition module 109 is configured to perform speech recognition on the audio data to recognized to determine an intention of the audio data currently collected.

The filtering module 110 is configured to filter the audio data to be recognized through voice activity detection processing before performing speech recognition on the audio data to be recognized.

The recognition module 109 is configured to perform speech recognition on the filtered audio data to be recognized.

The message obtaining module 111 is configured to obtain a configuration message for indicating to perform wake-up detection on the audio data to be detected in the hardware abstraction layer before determining the first target audio data according to the start moment and the end moment of the wake-up phrase. The configuration message is sent by an application layer.

As a possible implementation, the wake-up module 104 is configured to send a wake-up triggering message to an application layer in response to determining that the audio data to be detected includes the wake-up phrase, such that the application layer performs wake-up control on the electronic device.

The storage module 112 is configured to store the audio data to be detected in a preset buffer after performing noise reduction processing on the collected audio data to generate the audio data to be detected.

The wake-up phrase detection module 103 is configured to perform wake-up phrase detection on the audio data to be detected in the preset buffer in response to determining that the audio data to be detected in the preset buffer reaches a threshold.

As a possible implementation, the noise reduction processing module 102 is configured to: perform the noise reduction processing on the collected audio data through a first thread to generate the audio data to be detected. The wake-up phrase detection module 103 is configured to, in response to determining that the audio data to be detected in the preset buffer reaches the threshold, perform the wake-up phrase detection on the audio data to be detected in the preset buffer through a second thread.

The transmitting module 113 is configured to transmit the audio data to be detected to an application of the electronic device through an audio data transmission link in the electronic device after performing noise reduction processing on the collected audio data to generate the audio data to be detected.

It should be noted that, the description for the method for waking up via a speech is also applied to the description for the apparatus for waking up via a speech, which is not elaborated herein.

With the apparatus for waking up via a speech according to embodiments of the present disclosure, the audio data currently collected by the electronic device is obtained through the audio-video interface on the hardware abstraction layer of the electronic device, the noise reduction processing is performed on the collected audio data to generate the audio data to be detected, the wake-up phrase detection is performed on the audio data to be detected to determine whether the audio data to be detected includes the wake-up phrase, and the wake-up processing is performed on the electronic device in response to determining that the audio data to be detected includes the wake-up phrase. With the present disclosure, the noise reduction processing and the function of the wake-up phrase detection for the audio data are performed in a same software layer, instead of transmitting the audio data subjected to the noise reduction processing to the application layer through an audio transmission link of a system, and then performing wake-up detection through an application layer, thus greatly improving the speech wake-up efficiency and reducing the wake-up delay.

To achieve the above embodiments, the present disclosure also provides a computing device. The computing device includes a memory, a processor and a computer program stored in the memory and executable by the processor. When the processor is configured to execute the computer program, the method for waking up via a speech according to the above embodiments of the present disclosure is implemented.

To achieve the above embodiments, the present disclosure also provides a computer readable storage medium having a computer program stored thereon. When the computer program is executed by a processor, the method for waking up via a speech according to the above embodiments of the present disclosure is implemented.

Figure 12:
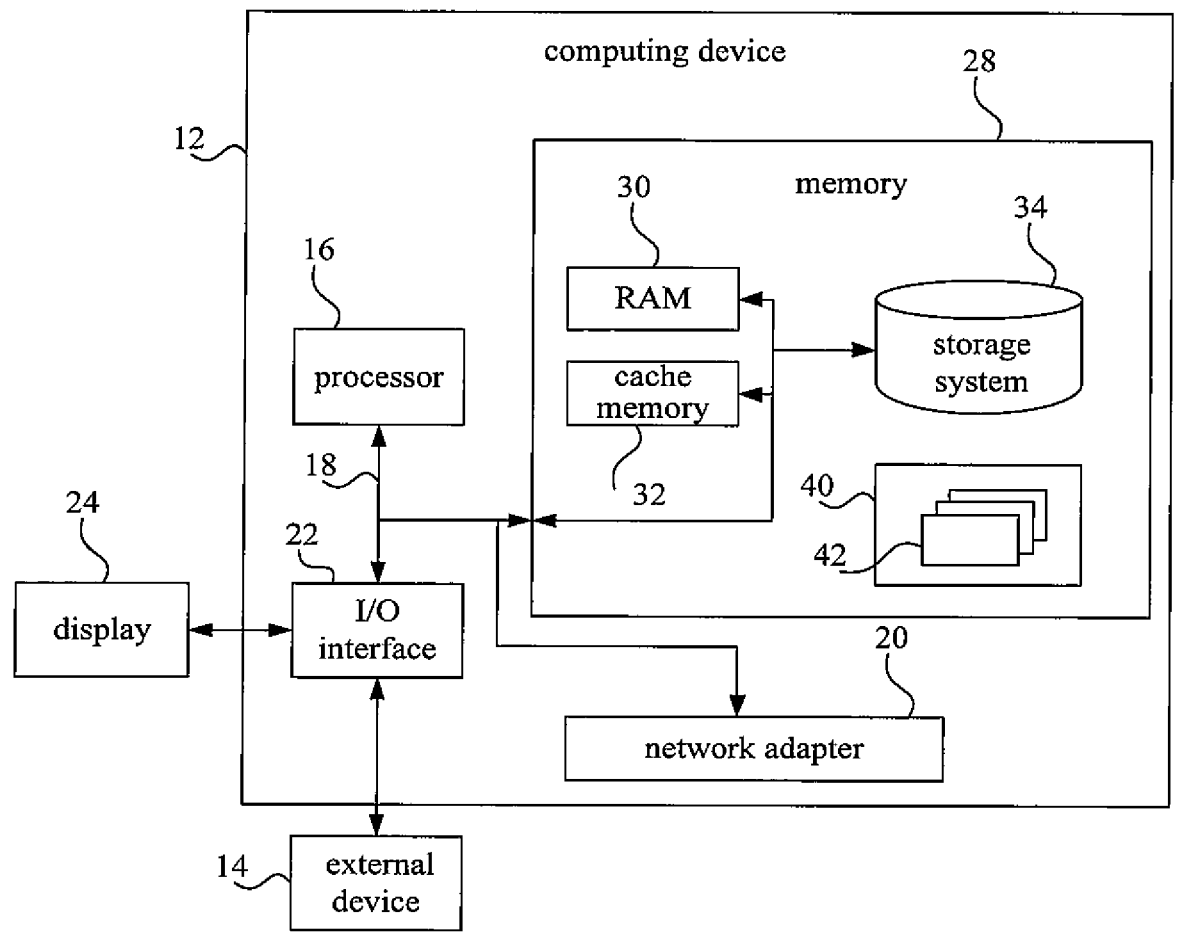
FIG. 12 is a block diagram illustrating an exemplary computing device capable of implementing implementations of the present disclosure.

FIG. 12 is a block diagram illustrating an exemplary computing device capable of implementing implementations of the present disclosure. The computing device 12 illustrated in FIG. 12 is only an example, which may not bring any limitation to functions and scope of embodiments of the present disclosure.

As illustrated in FIG. 12, the computing device 12 is embodied in the form of a general-purpose computing device. Components of the computing device 12 may include but be not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The computing device 12 typically includes a plurality of computer system readable mediums. These mediums may be any usable medium that may be accessed by the computing device 12, including volatile and non-volatile mediums, removable and non-removable mediums.

The system memory 28 may include computer system readable mediums in the form of volatile medium, such as a random access memory (RAM) 30 and/or a cache memory 32. The computing device 12 may further include other removable/non-removable, volatile/non-volatile computer system storage mediums. Only as an example, the storage system 34 may be configured to read from and write to non-removable, non-volatile magnetic mediums (not illustrated in FIG. 12, and usually called "a hard disk driver"). Although not illustrated in FIG. 12, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected with the bus 18 by one or more data medium interfaces. The system memory 28 may include at least one program product. The program product has a set of program modules (such as, at least one program module), and these program modules are configured to execute functions of respective embodiments of the present disclosure. A program/utility tool 40, having a set (at least one) of program modules 42, may be stored in the system memory 28. Such program modules 42 include, but are not limited to, an operating system, one or more application programs, other program modules, and program data. Each or any combination of these examples may include an implementation of a networking environment. The program module 42 usually executes functions and/or methods described in embodiments of the present disclosure.

The computing device 12 may communicate with one or more external devices 14 (such as a keyboard, a pointing device, and a display 24), may further communicate with one or more devices enabling a user to interact with the computing device 12, and/or may communicate with any device (such as a network card, and a modem) enabling the computing device 12 to communicate with one or more other computing devices. Such communication may occur via an input/output (I/O) interface 22. Moreover, the computing device 12 may further communicate with one or more networks (such as local area network (LAN), wide area network (WAN) and/or public network, such as Internet) via a network adapter 20. As illustrated in FIG. 12, the network adapter 20 communicates with other modules of the computing device 12 via the bus 18. It should be understood that, although not illustrated in FIG. 12, other hardware and/or software modules may be used in combination with the computing device 12, including but not limited to: microcode, device drivers, redundant processing units, external disk drive arrays, RAID (redundant array of independent disks) systems, tape drives, and data backup storage systems, etc.

The processing unit 16, by operating programs stored in the system memory 28, executes various function applications and data processing, for example implements a method for waking up via a speech described the above embodiments.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, the schematic representation of the above-mentioned terms does not necessarily refer to the same embodiment or example. Furthermore, the particular features, structures, materials, or characteristics may be combined in any suitable manner in one or more embodiments or examples. In addition, without a contradiction, different embodiments or examples and the features of the different embodiments or examples may be combined by those skilled in the art.

In addition, the terms "first", "second" are only for description purpose, it may not be understood as indicating or implying its relative importance or implying the number of indicated technology features. Thus, features defined as "first", "second" may explicitly or implicitly include at least one of the features. In the description of the present disclosure, "a plurality of" means at least two, such as two, three, unless specified otherwise.

Any procedure or method described in the flow charts or described in any other way herein may be understood include one or more modules, portions or parts for executing instruction codes that implement steps of a custom logic function or procedure. And preferable embodiments of the present disclosure includes other implementation, in which the order of execution is different from that which is depicted or discussed, including executing functions in a substantially simultaneous manner or in an opposite order according to the related functions, which may be understood by the skilled in the art of embodiments of the present disclosure.

The logic and/or step described in other manners herein or shown in the flow chart, for example, a particular sequence table of executable instructions for realizing the logical function, may be specifically achieved in any computer readable medium to be used by the instruction execution system, device or equipment (such as a system based on computers, a system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (non-exhaustive list) of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, it may be implemented by any one of the following technologies known in the art or a combination thereof as in another embodiment: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The skilled in the art may understand that all or some steps in the above embodiments may be completed by the means that relevant hardware is instructed by a program. The program may be stored in a computer readable storage medium, and the program includes any one or combination of the steps in embodiments when being executed.

In addition, respective function units in respective embodiments of the present disclosure may be integrated in a processing module, and respective unit may further exist physically alone, and two or more units may further be integrated in a module. The foregoing integrated module may be implemented either in the forms of hardware or software. If the integrated module is implemented as a software functional module and is sold or used as a stand-alone product, it may be stored in the computer readable storage medium.

The above-mentioned storage medium may be a read only memory, a magnetic disk or a disk and the like. Although embodiments of the present disclosure have been shown and described above, it should be understood that the above embodiments are exemplary, and it would be appreciated by the skilled in the art that the above embodiments cannot be construed to limit the present disclosure. The skilled in the art may make changes, alternatives, and modifications in the above embodiments without departing from scope of the present disclosure.

What is claimed is:

1. A method for waking up via a speech, comprising:
    obtaining audio data currently collected by an electronic device through an audio-video interface on a hardware abstraction layer of the electronic device;
    performing noise reduction processing on the collected audio data to generate audio data to be detected;
    performing wake-up phrase detection on the audio data to be detected to determine whether the audio data to be detected comprises a wake-up phrase; and
    performing wake-up processing on the electronic device in response to determining that the audio data to be detected comprises the wake-up phrase;
    wherein performing wake-up processing on the electronic device in response to determining that the audio data to be detected comprises the wake-up phrase comprises:

in response to determining that the audio data to be detected comprises the wake-up phrase, sending a wake-up triggering message to an application layer, such that the application layer performs wake-up control on the electronic device.

2. The method of claim 1, after determining that the audio data to be detected comprises the wake-up phrase, further comprising:
determining first target audio data according to a start moment and an end moment of the wake-up phrase;
performing wake-up orientation detection on the first target audio data to determine a current wake-up orientation;
determining second target audio data according to the current wake-up orientation;
performing enhancement processing on the second target audio data to generate audio data to be recognized; and
performing speech recognition on the audio data to be recognized to determine an intention of the audio data currently collected.

3. The method of claim 2, before performing speech recognition on the audio data to be recognized, further comprising:
filtering the audio data to be recognized through voice activity detection processing;
wherein performing speech recognition on the audio data to be recognized comprises:
performing speech recognition on the filtered audio data to be recognized.

4. The method of claim 2, before determining the first target audio data according to the start moment and the end moment of the wake-up phrase, further comprising:
obtaining a configuration message for indicating to perform wake-up detection on the audio data to be detected in the hardware abstraction layer, the configuration message being sent by an application layer.

5. The method of claim 1, after performing noise reduction processing on the collected audio data to generate the audio data to be detected, further comprising:
storing the audio data to be detected in a preset buffer;
wherein performing wake-up phrase detection on the audio data to be detected comprises:
in response to determining that the audio data to be detected in the preset buffer reaches a threshold, performing the wake-up phrase detection on the audio data to be detected in the preset buffer.

6. The method of claim 5, wherein performing noise reduction processing on the collected audio data to generate the audio data to be detected comprises:
performing the noise reduction processing on the collected audio data through a first thread, to generate the audio data to be detected; and
in response to determining that the audio data to be detected in the preset buffer reaches the threshold, performing wake-up phrase detection on the audio data to be detected in the preset buffer comprises:
in response to determining that the audio data to be detected in the preset buffer reaches the threshold, performing the wake-up phrase detection on the audio data to be detected in the preset buffer through a second thread.

7. The method of claim 1, after performing noise reduction processing on the collected audio data to generate the audio data to be detected, further comprising:
transmitting the audio data to be detected to an application of the electronic device through an audio data transmission link in the electronic device.

8. An electronic device, comprising: a memory, a processor and a computer program stored in the memory and executable by the processor, wherein when the computer program is executed by the processor, a method for waking up via a speech is implemented, the method comprising:
obtaining audio data currently collected by the electronic device through an audio-video interface on a hardware abstraction layer of the electronic device;
performing noise reduction processing on the collected audio data to generate audio data to be detected;
performing wake-up phrase detection on the audio data to be detected to determine whether the audio data to be detected comprises a wake-up phrase; and
performing wake-up processing on the electronic device in response to determining that the audio data to be detected comprises the wake-up phrase;
wherein performing wake-up processing on the electronic device in response to determining that the audio data to be detected comprises the wake-up phrase comprises:
in response to determining that the audio data to be detected comprises the wake-up phrase, sending a wake-up triggering message to an application layer, such that the application layer performs wake-up control on the electronic device.

9. The electronic device of claim 8, wherein, after determining that the audio data to be detected comprises the wake-up phrase, the method further comprises:
determining first target audio data according to a start moment and an end moment of the wake-up phrase;
performing wake-up orientation detection on the first target audio data to determine a current wake-up orientation;
determining second target audio data according to the current wake-up orientation;
performing enhancement processing on the second target audio data to generate audio data to be recognized; and
performing speech recognition on the audio data to be recognized to determine an intention of the audio data currently collected.

10. The electronic device of claim 9, wherein before performing speech recognition on the audio data to be recognized, the method further comprises:
filtering the audio data to be recognized through voice activity detection processing;
performing speech recognition on the audio data to be recognized comprises:
performing speech recognition on the filtered audio data to be recognized.

11. The electronic device of claim 9, wherein before determining the first target audio data according to the start moment and the end moment of the wake-up phrase, the method further comprises:
obtaining a configuration message for indicating to perform wake-up detection on the audio data to be detected in the hardware abstraction layer, the configuration message being sent by an application layer.

12. The electronic device of claim 8, wherein after performing noise reduction processing on the collected audio data to generate the audio data to be detected, the method further comprises:
storing the audio data to be detected in a preset buffer;
performing wake-up phrase detection on the audio data to be detected comprises:
in response to determining that the audio data to be detected in the preset buffer reaches a threshold, performing the wake-up phrase detection on the audio data to be detected in the preset buffer.

13. The electronic device of claim 12, wherein performing noise reduction processing on the collected audio data to generate the audio data to be detected comprises:
- performing the noise reduction processing on the collected audio data through a first thread, to generate the audio data to be detected; and
- in response to determining that the audio data to be detected in the preset buffer reaches the threshold, performing wake-up phrase detection on the audio data to be detected in the preset buffer comprises:
- in response to determining that the audio data to be detected in the preset buffer reaches the threshold, performing the wake-up phrase detection on the audio data to be detected in the preset buffer through a second thread.

14. The electronic device of claim 8, wherein after performing noise reduction processing on the collected audio data to generate the audio data to be detected, the method further comprises:
- transmitting the audio data to be detected to an application of the electronic device through an audio data transmission link in the electronic device.

15. A non-transitory computer readable storage medium having a computer program stored thereon, wherein when the computer program is executed by a processor, a method for waking up via a speech is implemented, the method comprising:
- obtaining audio data currently collected by an electronic device through an audio-video interface on a hardware abstraction layer of the electronic device;
- performing noise reduction processing on the collected audio data to generate audio data to be detected;
- performing wake-up phrase detection on the audio data to be detected to determine whether the audio data to be detected comprises a wake-up phrase; and
- performing wake-up processing on the electronic device in response to determining that the audio data to be detected comprises the wake-up phrase;
- wherein performing wake-up processing on the electronic device in response to determining that the audio data to be detected comprises the wake-up phrase comprises:
- in response to determining that the audio data to be detected comprises the wake-up phrase, sending a wake-up triggering message to an application layer, such that the application layer performs wake-up control on the electronic device.

16. The non-transitory storage medium of claim 15, wherein, after determining that the audio data to be detected comprises the wake-up phrase, the method further comprises:
- determining first target audio data according to a start moment and an end moment of the wake-up phrase;
- performing wake-up orientation detection on the first target audio data to determine a current wake-up orientation;
- determining second target audio data according to the current wake-up orientation;
- performing enhancement processing on the second target audio data to generate audio data to be recognized; and
- performing speech recognition on the audio data to be recognized to determine an intention of the audio data currently collected.

17. The non-transitory storage medium of claim 16, wherein before performing speech recognition on the audio data to be recognized, the method further comprises:
- filtering the audio data to be recognized through voice activity detection processing;
- performing speech recognition on the audio data to be recognized comprises:
- performing speech recognition on the filtered audio data to be recognized.

18. The non-transitory storage medium of claim 16, wherein before determining the first target audio data according to the start moment and the end moment of the wake-up phrase, the method further comprises:
- obtaining a configuration message for indicating to perform wake-up detection on the audio data to be detected in the hardware abstraction layer, the configuration message being sent by an application layer.

* * * * *